May 2, 1944.　　V. G. REILING　　2,347,798
BELT
Filed March 10, 1941

Inventor
VICTOR G. REILING,
Attorneys

Patented May 2, 1944

2,347,798

UNITED STATES PATENT OFFICE 2,347,798

BELT

Victor G. Reiling, Dayton, Ohio, assignor to The Dayton Rubber Mfg. Company, Dayton, Ohio, a corporation of Ohio Application March 10, 1941, Serial No. 382,468

6 Claims. (Cl. 74—233)

This invention relates to improvements in power transmitting belts.

It is the principal object of this invention to provide a V-type driving belt which has a plurality of working surfaces.

Another object is to devise a belt of triangular shaped cross section wherein one or more adjacent intersecting faces may be utilized for transmitting power.

Another object is to provide a power transmitting belt which is polygon shaped in cross section and wherein any two adjacent faces of the belt can be utilized for transmitting power with equal facility.

Still another object is to provide a belt comprising multiple V-shaped external working surfaces any one or more of which can be utilized for transmitting power through a plurality of sheaves located in different planes normal to the longitudinal axis of the belt.

These and other objects and advantages will be apparent from the following description taken in connection with the drawing.

Figure 2:
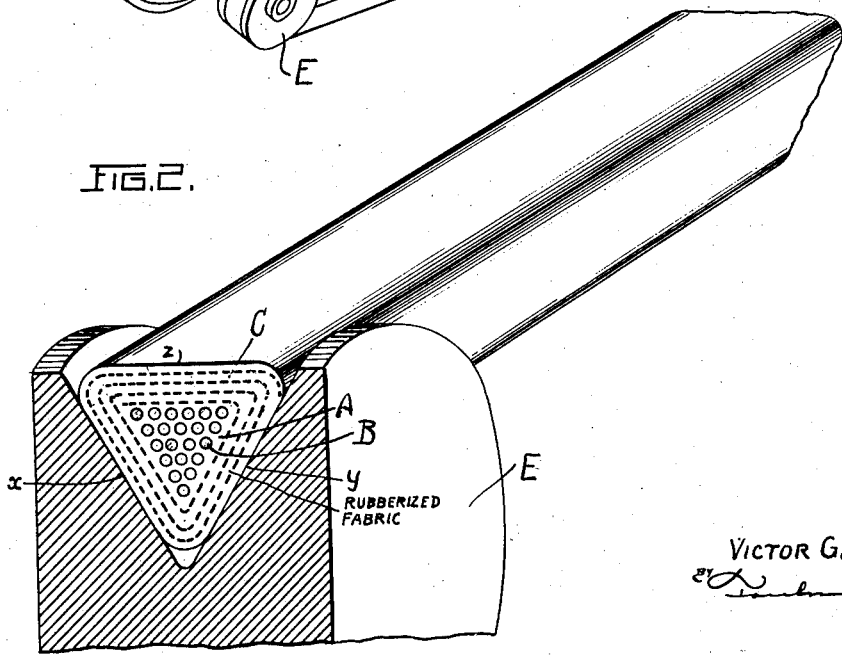
Figure 2 is an enlarged perspective view, partly in section, taken substantially on the line 2—2 of Figure 1 and looking in the direction of the arrows.

Referring to the drawing in detail, as shown in Figure 2, my belt comprises a triangular shaped wrapped belt having a central strength section A formed preferably of rubber composition reinforced with fine textile fibers having cords B extending longitudinally of the belt. The cords are embedded in vulcanized rubber compounded to give the required toughness and flexibility and the cords are substantially inextensible. An outer rubberized fabric layer C is spirally wound one or more times around the strength section A, which includes the cords B to provide a wrapped belt. The built-up belt is then placed in a triangular shaped mold and vulcanized to provide a finished belt.

The particular construction of the belt may be varied as desired to produce the proper strength and flexibility, the essential feature being in providing the multiple power transmitting V-shaped surfaces. In the triangular shaped belt illustrated, the cross sectional shape of the belt comprises an equilateral triangle wherein the three sides of the belt have equal faces, as illustrated in Figure 2 at $x$, $y$ and $z$. Any combination of intersecting faces of the belt may be utilized for transmitting power.

Figure 1:
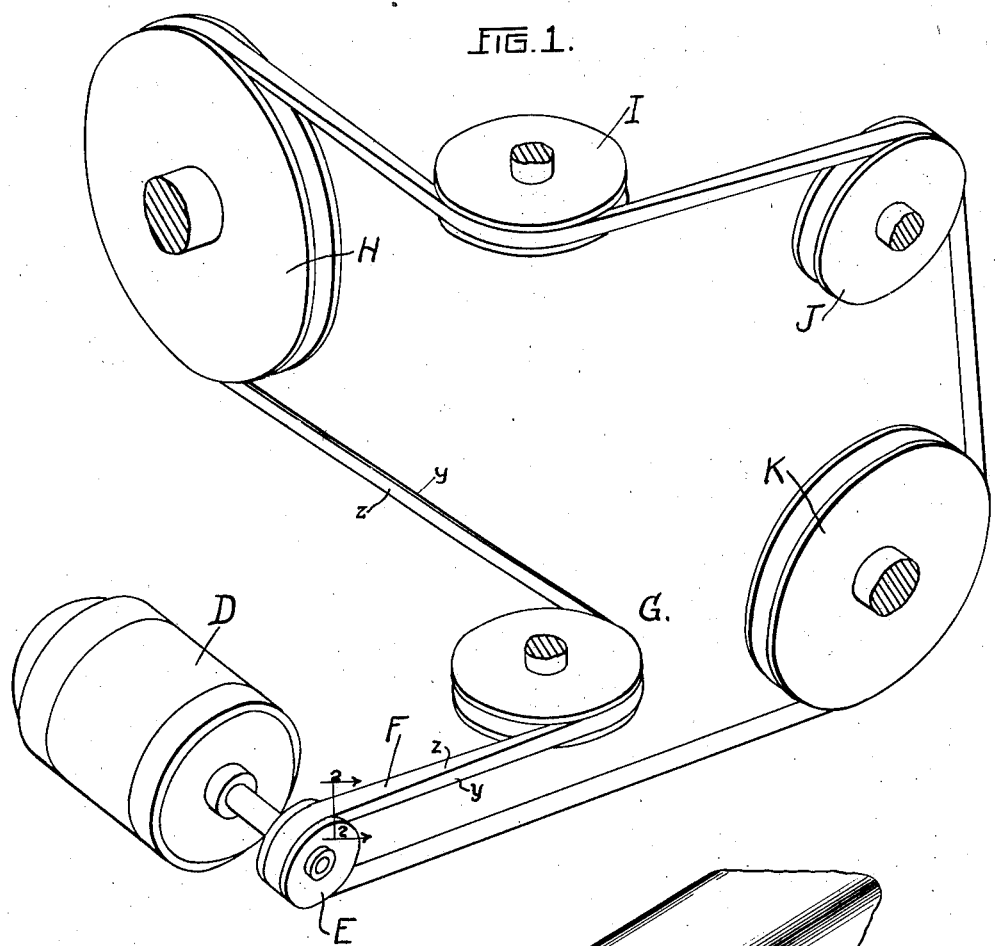
Figure 1 illustrates in perspective the arrangement of my improved triangular belt for transmitting power through sheaves located in different planes normal to the longitudinal axis of the belt.

The use of my triangular shaped belt for driving pulley sheaves arranged in different planes is illustrated in Figure 1. As shown, the motor D drives the attached pulley sheave E around which passes the triangular belt F which is passed over the pulley sheaves G, H, I, J and K. It will be observed that different working faces of the belt are utilized for transmitting power through the various pulley sheaves. For instance, the working surfaces of the belt engaging the driven pulley sheave E consist of the intersecting faces $x$ and $y$ whereas the surfaces $x$ and $z$ are used for transmitting power to the pulley sheave G. Similarly, the surfaces $z$ and $y$ of the triangular belt are used to drive the pulley sheave H. In this manner, the different working surfaces of the belt may be utilized without twisting the belt unduly. With the use of a three sided belt, it will be observed that a one-quarter turn or twist of the belt drives all the usual type of pulley sheaves and the wedging action of a V-belt can be utilized to advantage. This type of belt is greatly superior to a round belt, since a round belt does not provide the wedging action required to prevent slipping of the belt during use. My triangular belt overcomes this disadvantage and provides a belt which is more efficient and longer lasting than a round belt.

It will be understood that my invention is not to be limited to a triangular shaped belt but includes any polygon shaped or multi-sided working surface belt construction, the essential feature being that of providing a belt having a plurality of working surfaces, any pair of which can be utilized for transmitting power employing the wedging action as associated with a V-type belt.

Having thus fully described my invention, what I claim as new and desire to secure by Letters Patent, is:

1. A solid body power driving belt of equilateral triangular shape comprising an equilateral triangular core of inextensible cords embedded in rubber composition.

2. A solid body power driving belt of equilateral triangular shape adapted for transmitting power to sheaves located in different planes normal to the longitudinal axis of said belt, said belt having an equilateral triangular core centered therein and composed of inextensible cords embedded in rubber composition.

3. A belt of equilateral triangular shape comprising a central strength section of equilateral triangular shape including cords, said strength section being centered within said belt, said cords extending longitudinally of the belt, and superimposed rubberized fabric layers applied around said central strength section forming a built-up wrapped belt body wherein each side or face forms a power transmitting working surface.

4. A solid body power driving belt comprising a triangular core of inextensible cords embedded in rubber composition and wrapped in rubberized fabric having a plurality of V-shaped power transmitting working surfaces, said surfaces forming an equilateral triangle.

5. A power driving belt of the V-type comprising a centered central strength section including cords disposed in the form of a substantially equilateral triangular core and extending along the longitudinal axis of the belt, and superimposed rubberized fabric layers applied around said core, said belt surfaces forming an equilateral triangle, the working surfaces of said belt comprising adjacent intersecting sides formed at each corner of the triangle.

6. A power driving belt of equilateral triangular shaped cross section comprising a centered central strength section including cords disposed in the form of an equilateral triangular core and extending along the longitudinal axis of the belt and superimposed rubberized fabric layers applied around said core, said belt having a plurality of V-shaped power transmitting surfaces.

VICTOR G. REILING.